US012767405B2

(12) United States Patent
Kennedy et al.

(10) Patent No.: US 12,767,405 B2
(45) Date of Patent: Oct. 20, 2026

(54) CLOSEABLE SEALANT WRAP

(71) Applicant: The Patent Well LLC, Fort Worth, TX (US)

(72) Inventors: Josh Kennedy, Fort Worth, TX (US); Ashley Archard, Arlington, TX (US); Matt Boyd, Fort Worth, TX (US); Michael Dry, Fort Worth, TX (US); Ryan Merritt, Grapevine, TX (US); Brett Thompson, Aledo, TX (US)

(73) Assignee: The Patent Well LLC, Fort Worth, TX (US)

( * ) Notice: Subject to any disclaimer, the term of this patent is extended or adjusted under 35 U.S.C. 154(b) by 0 days.

(21) Appl. No.: 18/799,796

(22) Filed: Aug. 9, 2024

(65) Prior Publication Data

US 2025/0051074 A1 Feb. 13, 2025

Related U.S. Application Data

(60) Provisional application No. 63/518,690, filed on Aug. 10, 2023.

(51) Int. Cl.
*B65D 71/06* (2006.01)
*H01B 7/282* (2006.01)

(52) U.S. Cl.
CPC .......... *B65D 71/06* (2013.01); *H01B 7/2825* (2013.01); *B65D 2571/00129* (2013.01)

(58) Field of Classification Search
CPC .......... B65D 2571/00129; B65D 71/06; H01B 7/2825; B32B 2266/0278; B32B 2255/26; B32B 2307/7242; B32B 27/40; C09J 175/04
USPC ...... 229/87.01; 206/410, 397, 813; 428/352, 428/159, 375, 377, 41.7; 220/592.24; 427/118
See application file for complete search history.

(56) References Cited

U.S. PATENT DOCUMENTS 4,751,947 A * 6/1988 Landers .................. H02G 9/06 141/1
4,860,893 A * 8/1989 Kaufman ............. B65D 85/671 229/87.01
4,938,560 A * 7/1990 Arroyo .................. G02B 6/443 385/107
6,797,350 B2 * 9/2004 Schumacher ............. G09F 3/10 428/42.3
7,287,489 B1 * 10/2007 O'Brien ................ A01M 29/12 119/712
10,364,077 B2 * 7/2019 Lindberg ............... B65D 65/10

* cited by examiner

*Primary Examiner* — Christopher R Demeree
(74) *Attorney, Agent, or Firm* — Jack V. Musgrove; Daniel D. Chapman

(57) ABSTRACT

A closeable sealant wrap for placement about a workpiece includes a skin with a surface having a body dimensioned similar to the skin but narrower in width. Various closure means are deployed at one or more perimeter portions of the skin. The closure means may for example be a zipper which allows the sealant wrap to be enclosed around a wire, a fiber or a bundle of wires or fibers. The skin may be porous or non-porous. The body is a non-hardening, tacky polymer.

20 Claims, 4 Drawing Sheets

CLOSEABLE SEALANT WRAP

CROSS-REFERENCE TO RELATED APPLICATION

This application claims priority from U.S. Patent Application No. 63/518,690 filed Aug. 10, 2023, which is hereby incorporated.

BACKGROUND OF THE INVENTION

Field of the Invention

The present invention generally relates to sealants, and more particularly sealants dimensioned to wrap or bundle a wire, line or fiber or multiple wires, lines or fibers.

Description of the Related Art

Sealants are often used for protecting a workpiece from moisture and corrosion. Sealants sometimes include elastomers or tacky polymers that are adapted to physically seal or cover a part or surface of a workpiece so as to prevent access from moisture.

SUMMARY OF THE INVENTION

The present invention in at least one embodiment is generally directed to a sealant for at least partially wrapping wires, lines or fibers, the sealant comprising a skin, a body and a closure means. The skin may be porous or non-porous and include a perimeter, an outer surface and an inner surface. The body is typically a non-hardening, typically tacky polymer and engages at least part of the inner surface of the skin. Closure means engages at least a first portion of the perimeter for releasably engaging a second portion of the perimeter when the wires, lines or fibers are wrapped or secured there within.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
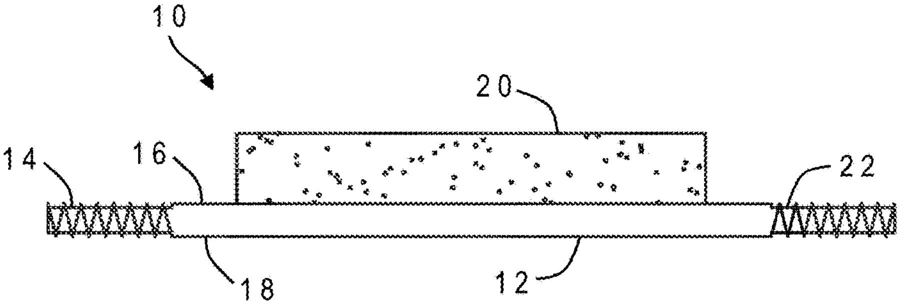
FIG. 1 is a sectional view of the sealant wrap in accordance with one embodiment of the present invention.

FIG. 1 illustrates an embodiment of the sealant wrap 10 before it is placed on a workpiece. It is seen to have a skin

12 that has a perimeter 14 and inner surface 16 and an outer surface 18. At least one surface, here an inner surface, has an elastomer body 20 engaged thereto which is typically dimensioned similar to the skin but narrower in width. At one or a number of perimeter portions of the skin are closure means 22. Closure means in one embodiment are a zipper 22*a*, see FIG. 5, having a first zipper section on a first perimeter portion of the skin and a second zipper section on a second perimeter portion of the skin so that the two zipper portions may engage when the wrap sealant is wrapped around a wire, a fiber or a bundle of wires or fibers as seen in FIG. 2.

Figure 2:
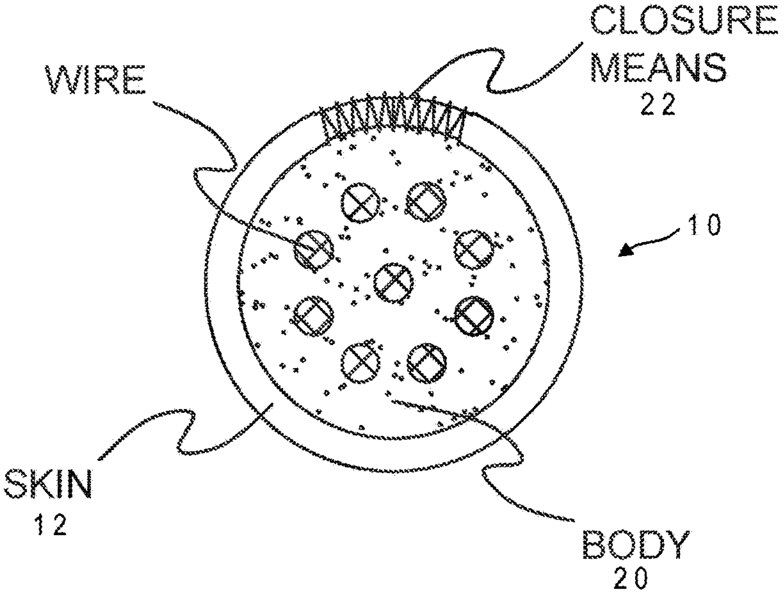
FIGS. 2 and 3 are cross-sections of a circular embodiment and a tabular embodiment of the sealant wrap of the present invention.
Figure 3:
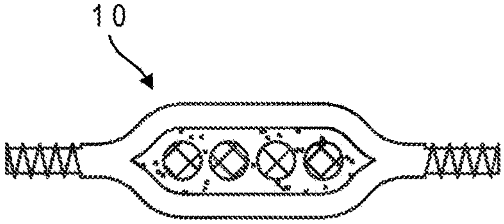

FIGS. 2 and 3 illustrate cross sections of a circular wrap sealant or a flat, tabular wrap sealant both for enclosing or substantially enclosing a wire, line, fiber or bundles of the same. When closure means 22 are engaged, wrapping or substantially wrapping the bundle, the elastomer body 20 is typically squeezed at least partially into, around and/or among the wires and enclosed by the skin as seen in FIGS. 2 through 11.

The skin 12 typically has one or more of the following properties: flame-proof, stretchable/elastic, semi-porous, (or impervious to fluids), inert to water and oil, thermoplastic, elastomeric, electrically conductive, (or semi-conductive or non-conductive), self-fusing, metallic (or nonmetallic), fabric, woven (or non-woven), tear-resistant. The skin functions to provide an outer surface to the wrap that is tough and durable. In some embodiments, the skin is one of polytetrafluoroethylene or polyurethane.

The body 20 may have one or more of the following properties: flame-proof, toxic-free, soft, elastic, clean removability from a substrate, non-drying, and hydrophobic. The body functions to engage the wires or fibers and two at least partially or completely encapsulate them so as to prevent moisture from reaching them.

Closure means 22 allow at least one perimeter portion to engage a second perimeter portion so as to wrap or enclose therein a fiber or wire or a bundle of the same. Closure means 22 may take various forms including snaps 22*g* (see FIG. 4), zipper closure means 22*a* (see FIG. 5), a cure-in-place injectable polymer bead 22*b* (see FIGS. 6 and 7), a pressure sensitive adhesive 22*c* (see FIG. 8), magnets 22*d* (see FIG. 9), a self-fusing skin 22*e* (see FIG. 10), as well as hook-and-pile (Velcro) 22*f* (see FIG. 11), and press-seal or lock track (baggie type, not shown).

The elasticity of the skin 12 in some embodiments may be up to 50%, in other embodiments up to 125% and in yet further embodiments up to 300%. The hardness of the skin in some embodiments may be Shore A, 0 to 100 or Shore D, 0 to 100. The skin may be porous, semi-porous or non-porous and impervious to fluids. The skin may be conductive, semiconductive or nonconductive to electricity, or self-fusing (silicon tape or butyl rubber for example).

The body 20 may be an elastomeric, non-drying, tacky gel in some embodiments. It may have a gel strength, Bloom value of 0 to 300. It may have a hardness of Shore OO 1-100, or Shore A 0-100. In some embodiments or it may be harder or softer. In some embodiments the gel is a polyurethane gel, and in some embodiments the gel is 100% solids, no volatile organic compounds (VOCs). In some embodiments the body is flame-proof by the addition of, for example, non-halogenated fire retardants.

Figure 4:
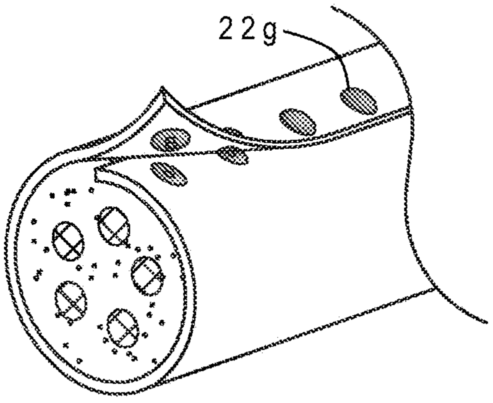
FIGS. 4, 5, 6, 7, 8, 9, 10 and 11 illustrate sectional views in perspective of various embodiments for closure means of the sealant wrap, respectively: snaps, a zipper, a cure-in-place polymer (FIGS. 6 and 7), a pressure sensitive adhesive (PSA), magnets, a self-fusing skin and a hook and pile fastener (hook and loop) in accordance with various implementations of the present invention.
Figure 5:
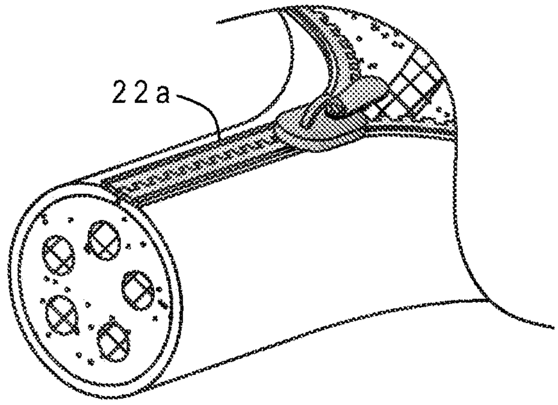
Figure 6:
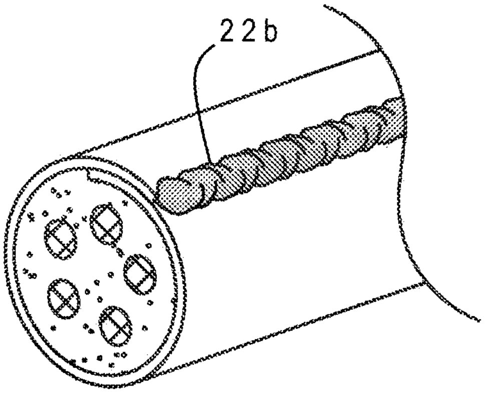
Figure 7:
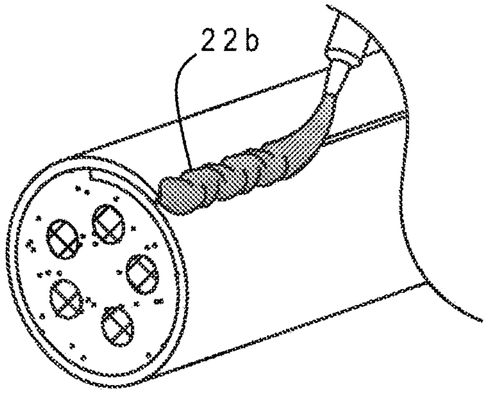
Figure 8:
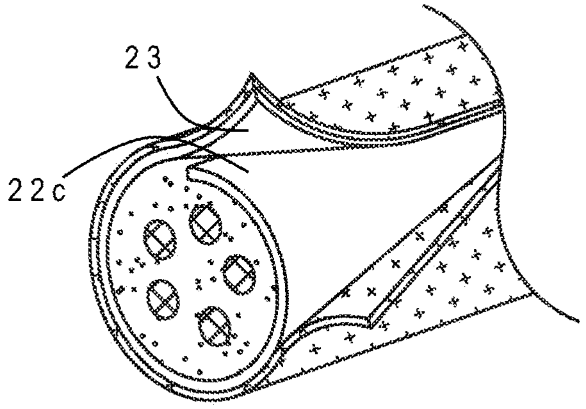

Closure means 22 allow for a first perimeter portion of the skin to releasably contact a second perimeter portion. For example, if the skin were rectangular, opposed perimeter portions may engage closure means so that the sealant wrap may enclose a work piece by virtue of the closure means on at least one portion releasably engaging the closure means on a second perimeter portion. For example, closure means are seen in FIG. 5 to be a zipper, in which case closure means have a first and second portion engaged in the first and second perimeter portion and when the wrap encloses a bundle of wires, the zipper 22*a* may be drawn to fix the one perimeter portion to the other. Moreover, if some stretch is required for the closure means to engage one another the elastomeric gel may be forced into, against and among the outer surfaces of the wire or wires in which it encloses. FIG. 4 illustrates a discontinuous closure means, here a series of snaps 22*g*. The discontinuous nature may be seen in comparing the zipper of FIG. 5 to the snaps of FIG. 4. FIGS. 6 and 7 illustrate that in some embodiments the closure means may be non-integral to the skin and simply require overlap of a first perimeter portion with a second, and then the application of a two-part polymer using a mix and apply two-part injector (see FIG. 7). The injected bead 22*b* hardens when it cures and thus seals the two perimeter portions one to the other. Moreover, the hardened bead may later be removed without damaging the skin. In FIG. 8 the underside (inner surface 16) of one of the perimeter portions may contain pressure sensitive adhesive 22*c* which may be covered with a cover strip 23, in which case removal of the cover strip and pressing the adhesive containing underside of the perimeter portion against the outer surface of the skin which it overlaps (see FIG. 8) will affect closure and encircling or encapsulation of a wire or wire bundle.

Figure 9:
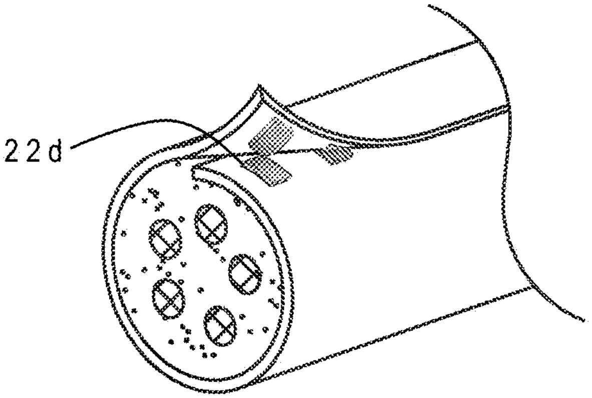
Figure 10:
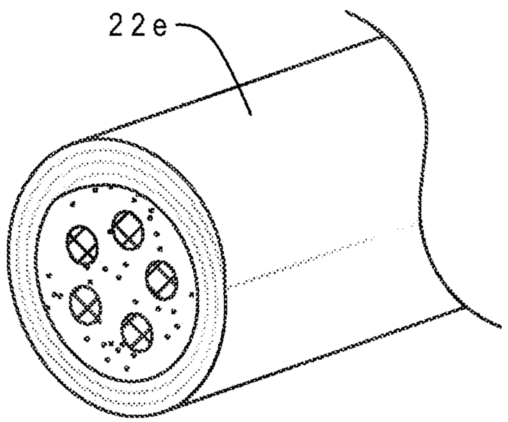
Figure 11:
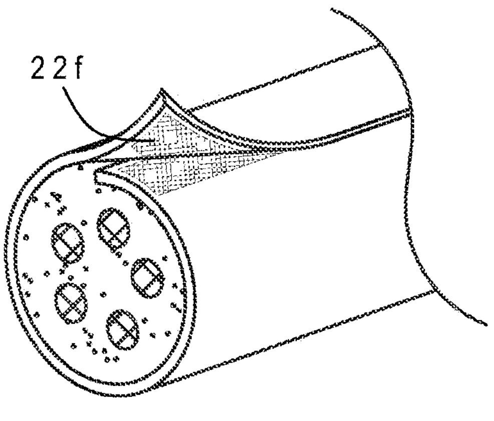

The closure means 22 is typically releasable. In typical cases the skin is flexible and stretchable and will allow for some compression on the wire bundle. When Velcro closure means 22*f* is used see FIG. 11 note that either the hook or the pile may extend over a substantial portion of the outer surface of the skin so that the inner portion containing the other of the hooker or pile can be stretched in placed at any overlapping distance that's allowing for a wider wrap to be used for a smaller bundle. FIG. 9 illustrates a closure means that comprises at least a pair of magnets 22*d*, one in a first perimeter portion and the second of opposite polarity and a second perimeter portion such that in overlapping the perimeter portions the magnets may engage one another to hold the skin and a wrapped position around the workpiece.

In the preceding description, for purposes of explanation, numerous details are set forth in order to provide a thorough understanding of the embodiments. However, it will be apparent to one skilled in the art that these specific details are not required. In other instances, well-known structures and components are shown in clock diagram form in order not to obscure the understanding.

The above-described embodiments are intended to be examples only. Alterations, modifications and variations can be affected to the particular embodiments by those of skill in the art. The scope of the claims should not be limited by the particular embodiments set forth in the examples but should be given the broadest interpretation consistent with the specification as a whole.

What is claimed is:

1. A sealant for at least partly covering a workpiece, the sealant comprising:

a skin having a perimeter, an outer surface and an inner surface, the skin dimensioned to at least partly cover the workpiece;

a body comprising a tacky, non-hardening, elastomeric polymer, the body engaging at least part of the inner surface of said skin; and closure means engaging at least a first portion of the perimeter for releasably engaging a second portion of the perimeter when said skin at least partly covers the workpiece, wherein said tacky polymer body is polyurethane gel.

2. The sealant of claim 1 further including a metallic or non-metallic skeleton.

3. The sealant of claim 2 wherein said skeleton is woven.

4. The sealant of claim 1 wherein said skin has one or more of the following properties: flame-proof, elasticity, inert to water and oil, semi-porous, impervious to fluids, thermoplasticity, or tear resistance.

5. The sealant of claim 1 wherein said body has one or more of the following properties: flame-proof, elasticity, hardness, clean removability from a substrate, and non-toxicity.

6. The sealant of claim 1 wherein said closure means includes one or a combination of the following: hook and pile, magnets, pressure sensitive adhesive, snaps, lock track (baggie type), or cure-in-place injectable bead.

7. The sealant of claim 1 wherein said closure means is continuous.

8. The sealant of claim 1 wherein said closure means is discontinuous.

9. The sealant of claim 1 wherein said closure means is integral with said skin.

10. The sealant of claim 1 wherein said skin is one of polytetrafluoroethylene or polyurethane.

11. The sealant of claim 1 wherein said closure means is a cure-in-place injectable bead.

12. The sealant of claim 1 wherein said closure means is hook and pile.

13. The sealant of claim 1 wherein said closure means is a pressure sensitive adhesive.

14. The sealant of claim 1 wherein said closure means is snaps.

15. The sealant of claim 1 wherein said closure means is magnets.

16. The sealant of claim 1 wherein said closure means is a lock track.

17. A sealant for at least partly covering a workpiece, the sealant comprising:

a skin having a perimeter, an outer surface and an inner surface, the skin dimensioned to at least partly cover the workpiece;

a body comprising a tacky, non-hardening, elastomeric polymer, the body engaging at least part of the inner surface of said skin; and closure means engaging at least a first portion of the perimeter for releasably engaging a second portion of the perimeter when said skin at least partly covers the workpiece, wherein said skin is one of polytetrafluoroethylene or polyurethane.

18. A sealant for at least partly covering a workpiece, the sealant comprising:

a skin having a perimeter, an outer surface and an inner surface, the skin dimensioned to at least partly cover the workpiece;

a body comprising a tacky, non-hardening, elastomeric polymer, the body engaging at least part of the inner surface of said skin; and closure means engaging at least a first portion of the perimeter for releasably engaging a second portion of the perimeter when said skin at least partly covers the workpiece, wherein said skeleton is metallic or non-metallic and woven.

19. A sealant for at least partly covering a workpiece, the sealant comprising:

a skin having a perimeter, an outer surface and an inner surface, the skin dimensioned to at least partly cover the workpiece;

a body comprising a tacky, non-hardening, elastomeric polymer, the body engaging at least part of the inner surface of said skin; and closure means engaging at least a first portion of the perimeter for releasably engaging a second portion of the perimeter when said skin at least partly covers the workpiece, wherein said closure means is a cure-in-place injectable bead.

20. A sealant for at least partly covering a workpiece, the sealant comprising:

a skin having a perimeter, an outer surface and an inner surface, the skin dimensioned to at least partly cover the workpiece;

a body comprising a tacky, non-hardening, elastomeric polymer, the body engaging at least part of the inner surface of said skin; and closure means engaging at least a first portion of the perimeter for releasably engaging a second portion of the perimeter when said skin at least partly covers the workpiece, wherein said closure means is magnets.

* * * * *